US012793357B2

(12) United States Patent
Gao et al.

(10) Patent No.: US 12,793,357 B2
(45) Date of Patent: Nov. 10, 2026

(54) INFORMATION INTERACTION METHOD, DEVICE, APPARATUS AND MEDIUM BASED ON AUGMENTED REALITY

(71) Applicant: Beijing Bytedance Network Technology Co., Ltd., Beijing (CN)

(72) Inventors: Linsen Gao, Beijing (CN); Xiaofeng Li, Beijing (CN); Yi Wei, Beijing (CN); Jiacheng Liu, Beijing (CN); Yuhong Zhang, Beijing (CN)

(73) Assignee: BEIJING BYTEDANCE NETWORK TECHNOLOGY CO., LTD., Beijing (CN)

( * ) Notice: Subject to any disclaimer, the term of this patent is extended or adjusted under 35 U.S.C. 154(b) by 300 days.

(21) Appl. No.: 18/688,701

(22) PCT Filed: Sep. 21, 2022

(86) PCT No.: PCT/CN2022/120156

§ 371 (c)(1),
(2) Date: Mar. 1, 2024

(87) PCT Pub. No.: WO2023/071630

PCT Pub. Date: May 4, 2023

(65) Prior Publication Data

US 2024/0378825 A1 Nov. 14, 2024

(30) Foreign Application Priority Data

Oct. 29, 2021 (CN) ......................... 202111275803.4

(51) Int. Cl.
*G06T 19/00* (2011.01)

(52) U.S. Cl.
CPC .................................. *G06T 19/006* (2013.01)

(58) Field of Classification Search
None
See application file for complete search history.

(56) References Cited

U.S. PATENT DOCUMENTS 9,513,700 B2 * 12/2016 Weising .................. G06F 3/017
11,157,739 B1 * 10/2021 Iskandar ............... H04W 4/021

(Continued)

FOREIGN PATENT DOCUMENTS

CN 105555373 A 5/2016
CN 109754471 A 5/2019

(Continued)

OTHER PUBLICATIONS

Office Action for Chinese Patent Application No. 202111275803.4, mailed on Jul. 23, 2025, 21 pages.

(Continued)

*Primary Examiner* — Ryan M Gray
(74) *Attorney, Agent, or Firm* — Astute IP Law Group

(57) ABSTRACT

The present application discloses an information interaction method, device, apparatus and medium based on augmented reality. The information interaction method includes: generating first interactive data in response to an interactive operation of a first virtual target in a virtual reality space, and sending the first interactive data to a first server terminal; receiving second interactive data corresponding to a second virtual target sent by the first server terminal, wherein the second virtual target and the first virtual target share the virtual reality space; and calling a physical engine to render the interactive operations of the first virtual target and the second virtual target in the virtual reality space based on the first interactive data and the second interactive data, and generating and displaying an interactive rendering result.

15 Claims, 7 Drawing Sheets

(56) References Cited

U.S. PATENT DOCUMENTS

| | | | | |
|---|---|---|---|---|
| 2013/0095924 | A1* | 4/2013 | Geisner | A63F 13/21 463/32 |
| 2013/0141421 | A1 | 6/2013 | Mount et al. | |
| 2013/0286004 | A1 | 10/2013 | Mcculloch et al. | |
| 2016/0093108 | A1* | 3/2016 | Mao | G02B 27/017 345/633 |
| 2018/0082117 | A1 | 3/2018 | Sharma et al. | |
| 2018/0239514 | A1 | 8/2018 | Vats | |
| 2019/0236843 | A1* | 8/2019 | Baumbach | H04W 4/06 |
| 2019/0379765 | A1* | 12/2019 | Fajt | A63F 13/55 |
| 2022/0114792 | A1* | 4/2022 | Kawamae | G06F 3/1454 |
| 2022/0148268 | A1* | 5/2022 | Yilanci | H04L 67/535 |
| 2022/0347576 | A1* | 11/2022 | Cheng | G06F 3/011 |
| 2024/0378825 | A1* | 11/2024 | Gao | G06F 3/011 |

FOREIGN PATENT DOCUMENTS

| | | | |
|---|---|---|---|
| CN | 111408137 | A | 7/2020 |
| CN | 112198959 | A | 1/2021 |
| CN | 112884906 | A | 6/2021 |
| WO | 2012007764 | A1 | 1/2012 |

OTHER PUBLICATIONS

Office Action for Chinese Patent Application No. 202111275803.4, mailed on Jan. 29, 2026, 24 pages.

* cited by examiner

INFORMATION INTERACTION METHOD, DEVICE, APPARATUS AND MEDIUM BASED ON AUGMENTED REALITY

The present disclosure is the U.S. national phase of PCT Application No. PCT/CN2022/120156 filed on Sep. 21, 2022, which claims the priority of Chinese Patent Application No. 202111275803.4 filed on Oct. 29, 2021, whose title is "an information interaction method, device, apparatus and medium based on augmented reality", and the entire content disclosed by the Chinese patent application is incorporated herein by reference as part of the present disclosure.

TECHNICAL FIELD

The present application belongs to a technical field of augmented reality, and in particular, relates to an information interaction method, device, apparatus and medium based on augmented reality.

BACKGROUND

Augmented Reality (AR) technology is a kind of technology that skillfully integrates virtual information with the real world, which simulates computer-generated virtual information such as texts, images, three-dimensional models, audios and videos, and so on and then applies it into the real world, to achieve an effect that these two kinds of information complement each other.

At present, there have appeared many interactive application programs developed based on the AR technology. A user may perform movement, a pre-set type of interaction with a set virtual target and so on in a virtual reality space provided by these applications, through his/her mobile terminal device.

However, neither of various kinds of current interactive application programs can realize an interaction of different users in the virtual reality space, which limits an interaction process of the users and reduces the user experience.

SUMMARY

To solve, or at least partially solve, the technical problems described above, the present disclosure provides an information interaction method, device, apparatus and medium based on augmented reality.

In a first aspect, the present disclosure provides an information interaction method based on augmented reality and applied to a first client terminal, the method comprises:

generating first interactive data in response to an interactive operation of a first virtual target in a virtual reality space, and sending the first interactive data to a first server terminal;

receiving second interactive data corresponding to a second virtual target sent by the first server terminal, wherein the second virtual target and the first virtual target share the virtual reality space; and calling a physical engine to render the interactive operations of the first virtual target and the second virtual target in the virtual reality space based on the first interactive data and the second interactive data, and generating and displaying an interactive rendering result.

In a second aspect, the present disclosure provides an information interaction method based on augmented reality and applied to a first server terminal, the method comprises:

receiving first interactive data and second interactive data, respectively, wherein the first interactive data is generated by an interactive operation of a first virtual target in a virtual reality space, and the second interactive data is generated by an interactive operation of a second virtual target in the virtual reality space, and the first virtual target and the second virtual target share the virtual reality space; and sending the first interactive data and the second interactive data to a first client terminal corresponding to the first virtual target and a second client terminal corresponding to the second virtual target, so that the first client terminal and the second client terminal respectively call a physical engine to render the interactive operation based on the first interactive data and the second interactive data, and generate and display an interactive rendering result.

In a third aspect, the present disclosure provides an information interaction device based on augmented reality and configured in a client terminal, the information interaction device comprises:

a first interactive data generation module, configured to generate first interactive data in response to an interactive operation of a first virtual target in a virtual reality space, and send the first interactive data to a first server terminal;

a second interactive data receiving module, configured to receive second interactive data corresponding to a second virtual target sent by the first server terminal, wherein the second virtual target and the first virtual target share the virtual reality space; and an interactive rendering result display module, configured to call a physical engine to render the interactive operation of the first virtual target and the second virtual target in the virtual reality space based on the first interactive data and the second interactive data, and generate and display an interactive rendering result.

In a fourth aspect, the present disclosure provides an information interaction device based on augmented reality and configured in a first server terminal, the information interaction device comprises:

an interactive data receiving module, configured to receive first interactive data and second interactive data, respectively, wherein the first interactive data is generated by an interactive operation of a first virtual target in a virtual reality space, and the second interactive data is generated by an interactive operation of a second virtual target in the virtual reality space, and the first virtual target and the second virtual target share the virtual reality space; and an interactive data sending module, configured to send the first interactive data and the second interactive data to a first client terminal corresponding to the first virtual target and a second client terminal corresponding to the second virtual target, so that the first client terminal and the second client terminal respectively call a physical engine to render the interactive operations based on the first interactive data and the second interactive data, and generate and display an interactive rendering result.

In a fifth aspect, the present disclosure provides an electronic apparatus, and the electronic apparatus comprises:

a processor; and a memory, configured to store an executable instruction, wherein the processor is configured to read the executable instruction from the memory and execute the executable instruction to realize the information interaction method based on augmented reality and applied to the first client terminal provided by any embodiment of the present disclosure or the information interaction method based on augmented reality and applied to the first server terminal provided by any embodiment of the present disclosure.

In a sixth aspect, the present disclosure provides a computer-readable storage medium, and the storage medium stores a computer program, which, when executed by a processor, causes the processor to realize the information interaction method based on augmented reality and applied to the first client terminal provided by any embodiment of the present disclosure, or realize the information interaction method based on augmented reality and applied to the first server terminal provided by any embodiment of the present disclosure.

BRIEF DESCRIPTION OF DRAWINGS

The drawings are used to provide further understanding of the present disclosure, form part of the specification, and are used to explain the present disclosure together with embodiments of the present disclosure, and do not constitute a limitation of the present disclosure. In the accompanying drawings.

DETAILED DESCRIPTION

Figure 1:
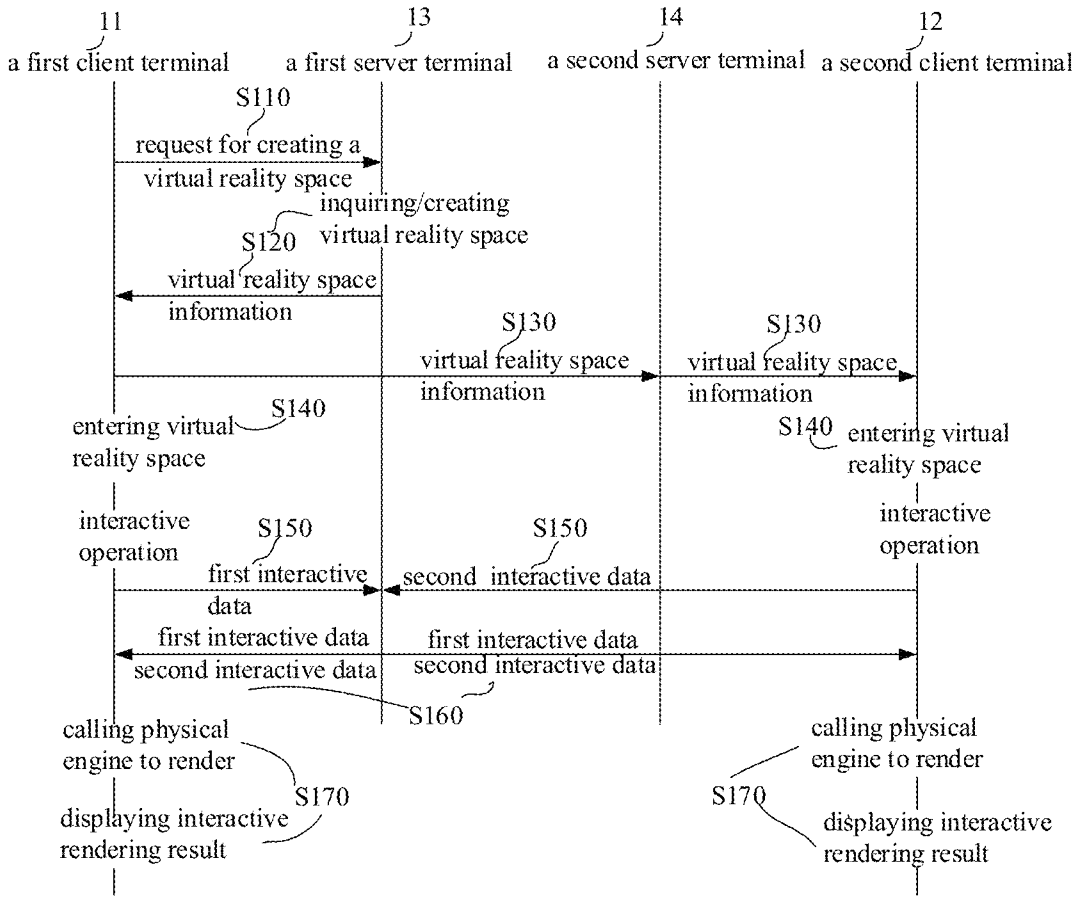
FIG. 1 is an architecture diagram of an information interaction system based on augmented reality provided by an embodiment of the present disclosure.

Embodiments of the present disclosure are described in more detail below with reference to the accompanying drawings. While some embodiments of the present disclosure are shown in the accompanying drawings, it should be understood that the present disclosure may be implemented in various forms and should not be interpreted as limited to the embodiments set forth herein, but rather are provided for a more thorough and complete understanding of the present disclosure. It should be understood that the drawings and embodiments of the present disclosure are for illustrative purposes only and are not intended to limit the protection scope of the present disclosure.

It should be understood that the various steps described in the method embodiments of the present disclosure may be performed in different sequences and/or in parallel. In addition, method embodiments may include additional steps and/or omit to execute the showing steps. The scope of the present disclosure is not limited in the respect.

The term "include" as used herein and its variations are open-ended including, i.e., "include but not limited to". The term "base" means "base at least in part". The term "one embodiment" means "at least one embodiment"; the term "another embodiment" means "at least one other embodiment"; the term "some embodiments" means "at least some embodiments". Relating definitions of other terms are given in the description below.

It needs to be noted that "first", "second" and other concepts mentioned in the present disclosure are used only to distinguish between different devices, modules or units and are not used to define the order or interdependence relationship of the functions performed by these devices, modules or units.

It needs to be noted that "one" and "more" mentioned in the present disclosure are schematic rather than restrictive and it should be understood by those skilled in the art that they should be understood to "one or more" unless expressly stated otherwise in the context.

The names of interacting messages or information between a plurality of devices in embodiment of the present disclosure are used for illustrative purposes only and are not used to limit the scope of such messages or information.

In related technologies, an interactive application program based on augmented reality technology mainly generates a virtual reality space by superimposing a virtual scene and a real scene, and provides some fixed virtual targets in the virtual reality space and sets preset types of interactive actions for the virtual targets. If a user interacts with the virtual target in the process of using the interactive application program, then the virtual target can only perform the above-mentioned preset type of interactions. For example, if both a user A and a user B use the same interactive application program, the user B presented in the client terminal of the user A is only a virtual target constructed according to the basic information of the user B (such as a life value, an appearance, etc.), which can only perform some preset types of actions, but cannot perform the interactive actions performed by the user B through his/her client terminal. In this way, the interaction process based on real interaction actions in the virtual reality space cannot be realized between different users.

Based on the above situation, embodiments of the present disclosure provide an information interaction solution based on augmented reality, which realizes that different users share the same virtual reality space, so that interactive data may be exchanged between client terminals corresponding to different users, and then the same interactive data is processed and rendered by physical engines in the client terminals, so that the interactive operation of respective virtual targets presented in the client terminals of different users is the same as the real interactive operation of users, and the interactive effect between different users is achieved, thereby improving the user experience.

The information interaction solution based on augmented reality provided by embodiments of the present disclosure may be applied to various interactive application programs developed based on augmented reality technology, for example, interactive home games based on virtual rooms, exhibition applications based on virtual exhibition halls, conference applications based on virtual conference halls, secret room escape games based on virtual secret rooms and so on.

FIG. 1 is an architecture diagram of an information interaction system based on augmented reality provided by an embodiment of the present disclosure.

As shown in FIG. 1, the information interaction system 100 based on augmented reality includes at least a first client terminal 11, a second client terminal 12, a first server terminal 13 and a second server terminal 14 which are connected with each other in communication. Wherein, the first server terminal 13 is a server terminal that performs background data processing of interactive application programs, and it is used to at least create and manage a virtual reality space, and process and send interactive data uploaded by various client terminals, etc. The first client terminal 11 is a client terminal corresponding to a first user, and the second client terminal 12 is a client terminal corresponding to a second user, and interactive application programs are running in each client terminal. The first server terminal 13 may be implemented as an independent server, and may also be implemented as a server cluster. The second server terminal 14 is a server terminal that performs address management and sharing of the virtual reality space. In a case that the first server terminal 13 is implemented as the server cluster, the second server terminal 14 is also used to dispatch an appropriate server from the server cluster to users.

Under the system architecture of FIG. 1, the overall flow of information interaction based on augmented reality in an embodiment of the present disclosure is as follows:

S110: the first client terminal 11 sends a request for creating a virtual reality space to the first server terminal 13.

S120: the first server terminal 13 inquires whether there is a virtual reality space corresponding to the first client terminal 11 in historical virtual reality spaces based on a user information of the first client terminal 11, and if yes, sends information of the inquired historical virtual reality space to the first client terminal 11; and if not, creates a new virtual reality space and send information of the new virtual reality space to the first client terminal 11.

S130: the first client terminal 11 sends the information of its virtual reality space to the second server terminal 14, so that the second server terminal 14 sends the information of the virtual reality space to the second client terminal 12.

S140: in a case that the first server terminal 13 is implemented as a server cluster, both the first client terminal 11 and the second client terminal 12 send a request for entering the same virtual reality space to the second server terminal 14 based on the information of the virtual reality space. The second server terminal 14 schedules an appropriate server for each client terminal according to load situation of servers in the cluster, and sends the scheduled server information to the first client terminal 11 and the second client terminal 12, respectively, so that the first client terminal 11 and the second client terminal 12 may enter the same virtual reality space.

In a case that the first server terminal 13 is implemented as an independent server, both the first client terminal 11 and the second client terminal 12 send a request for entering the same virtual reality space to the first server terminal 13 based on the information of the virtual reality space. The first server terminal 13 sends its server information to the first client terminal 11 and the second client terminal 12, so that the first client terminal 11 and the second client terminal 12 may enter the same virtual reality space.

S150: the first user and the second user perform interactive operations in the virtual reality space, respectively, and after the first client terminal 11 and the second client terminal 12 have detected corresponding interactive operations, they respectively generate first interactive data and second interactive data. The first client terminal 11 sends the first interactive data to the first server terminal 13, and the second client terminal 12 sends the second interactive data to the first server terminal 13.

S160: the first server terminal 13 transparently transmits the first interactive data and the second interactive data to the first client terminal 11 and the second client terminal 12, respectively.

S170: the first client terminal 11 and the second client terminal 12 respectively call a 3D physical engine therein to process the first interactive data and the second interactive data, perform rendering, and generate interactive rendering results and display them.

It should be noted that the terms involved in the above overall flow and the specific operation realization will be explained in the following embodiments.

First, an information interaction method based on augmented reality and applied to the first client terminal provided by an embodiment of the present disclosure will be described with reference to FIG. 2 to FIG. 5.

In an embodiment of the present disclosure, the method may be executed by an information interaction device based on augmented reality and configured at a first client terminal, and the information interaction device may be realized by software and/or hardware, and may be integrated in an electronic apparatus having position tracking and display functions. The electronic apparatus may include, but is not limited to, a mobile terminal such as a smart phone, a Personal Digital Assistant (PDA), a Tablet PC (PAD), a wearable device, and the like.

Figure 2:
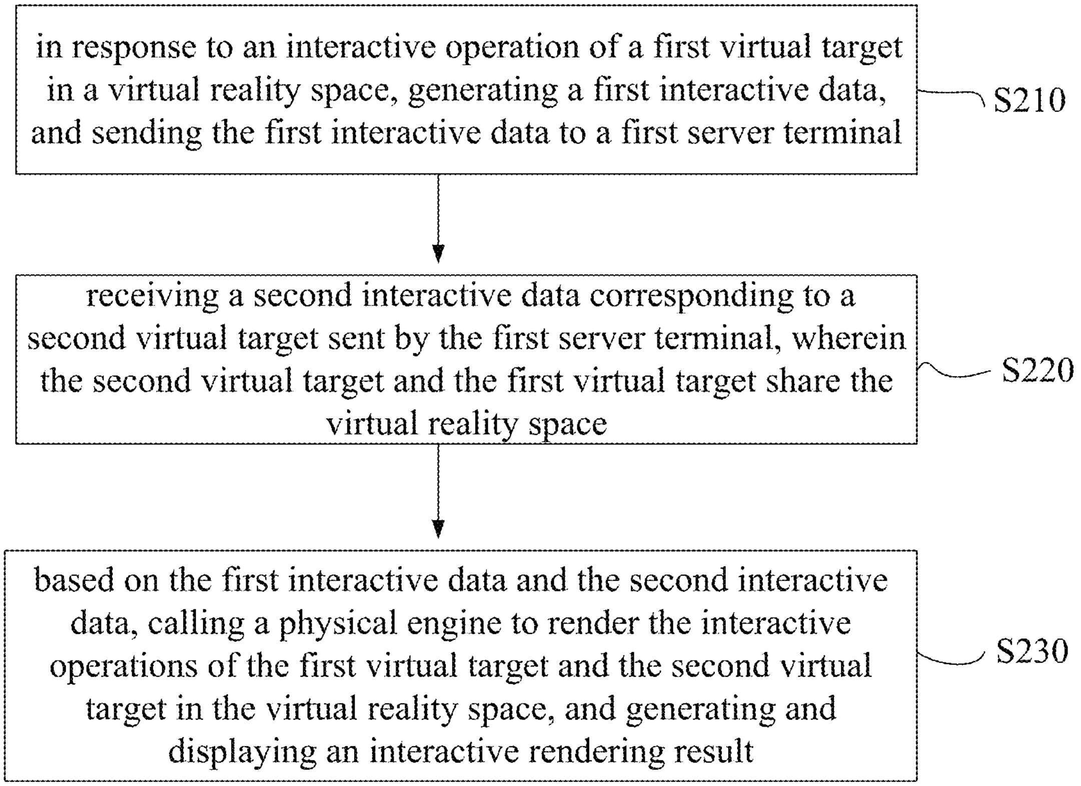
FIG. 2 is a schematic flowchart of an information interaction method based on augmented reality applied to a first client terminal provided by an embodiment of the present disclosure.

FIG. 2 shows a schematic flowchart of an information interaction method based on an augmented reality and applied to a first client terminal provided by an embodiment of the present disclosure. As shown in FIG. 2, taking the first client terminal as an example, the information interaction method based on augmented reality and applied to the first client terminal may include the following steps:

S210: in response to an interactive operation of the first virtual target in a virtual reality space, generating a first interactive data and sending it to a first server terminal.

Wherein, a virtual target refers to a virtual character of a user in the virtual reality space. The first virtual target refers to a virtual target corresponding to a first user. In some embodiments, the first virtual target is constructed based on person attribute information of the first user. The person attribute information may include height, gender, hairstyle, clothing, etc. The first user may input person attribute information through an electronic apparatus; or shoot his/her own image through a camera of the electronic apparatus, and get the person attribute information by performing a process of target recognition and so on on his/her own image; or scan his/her own body part through a radar sensor of the electronic apparatus to generate point cloud data, and obtain the person attribute information through processing the point cloud data. After that, the electronic apparatus may upload the person attribute information to the first server terminal. The first server terminal uses the person attribute information to construct a three-dimensional model of the character to obtain the first virtual target. This may increase connection between users and the virtual reality space, improve the visual effect of the users and further enhance the user experience.

Virtual reality space refers to a virtual space generated based on a real environment (such as a room), which has the same structure, layout and so on as the real environment. In some embodiments, the virtual reality space is constructed based on the real space where the first virtual target is located. For example, the first user may three-dimensionally scan the real space (such as a room) where he/she is located through a radar sensor of his/her electronic apparatus to generate point cloud data, and upload the point cloud data to the first server terminal. The first server terminal obtains the virtual reality space by processing the point cloud data. For another example, some virtual reality spaces are preset in the first server terminal, and the first user may choose a preset virtual reality space with a same/similar structure, layout and so on as/to the real space where he/she is located.

Interactive data refers to relevant data generated by an interactive operation, such as a position change and a moving speed generated by a moving operation. The first interactive data refers to interactive data corresponding to the first virtual target.

Specifically, after the first user logs in the client terminal in his/her electronic apparatus, the electronic apparatus (unless otherwise specified, in each method embodiment applied to the first client terminal, the electronic apparatus refers to the electronic apparatus corresponding to the first client terminal) may display various virtual reality space information. The first user may perform trigger operation (such as clicking, gesture control trigger, voice control trigger, eye movement control trigger, etc.) on the virtual reality space information corresponding to the virtual reality space where he/she wants to enter. After the electronic apparatus has detected the trigger operation of the user, it displays the virtual reality space corresponding to the triggered virtual reality space information.

Figure 3:
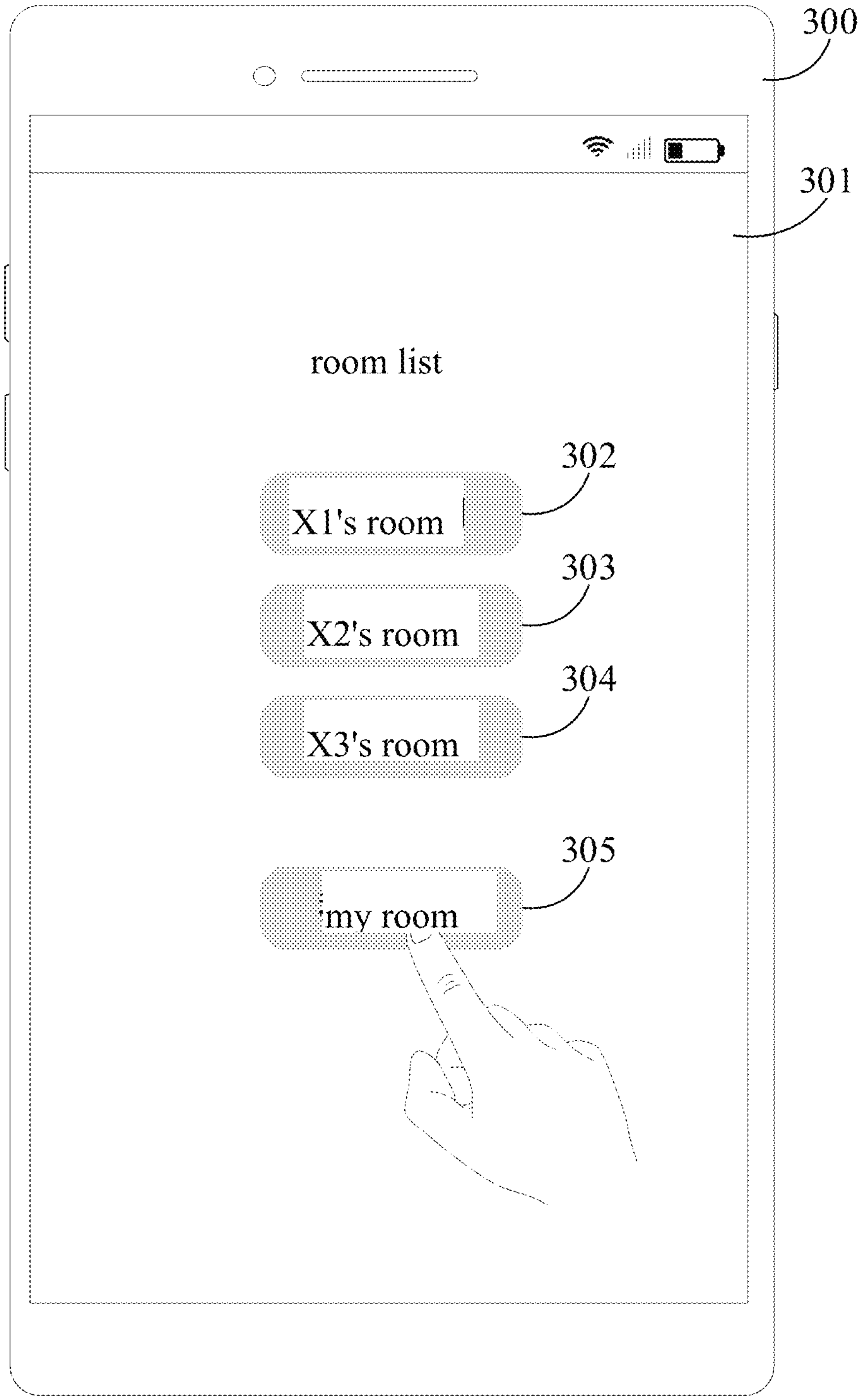
FIG. 3 is a schematic display diagram of a room list page provided by an embodiment of the present disclosure.
Figure 4:
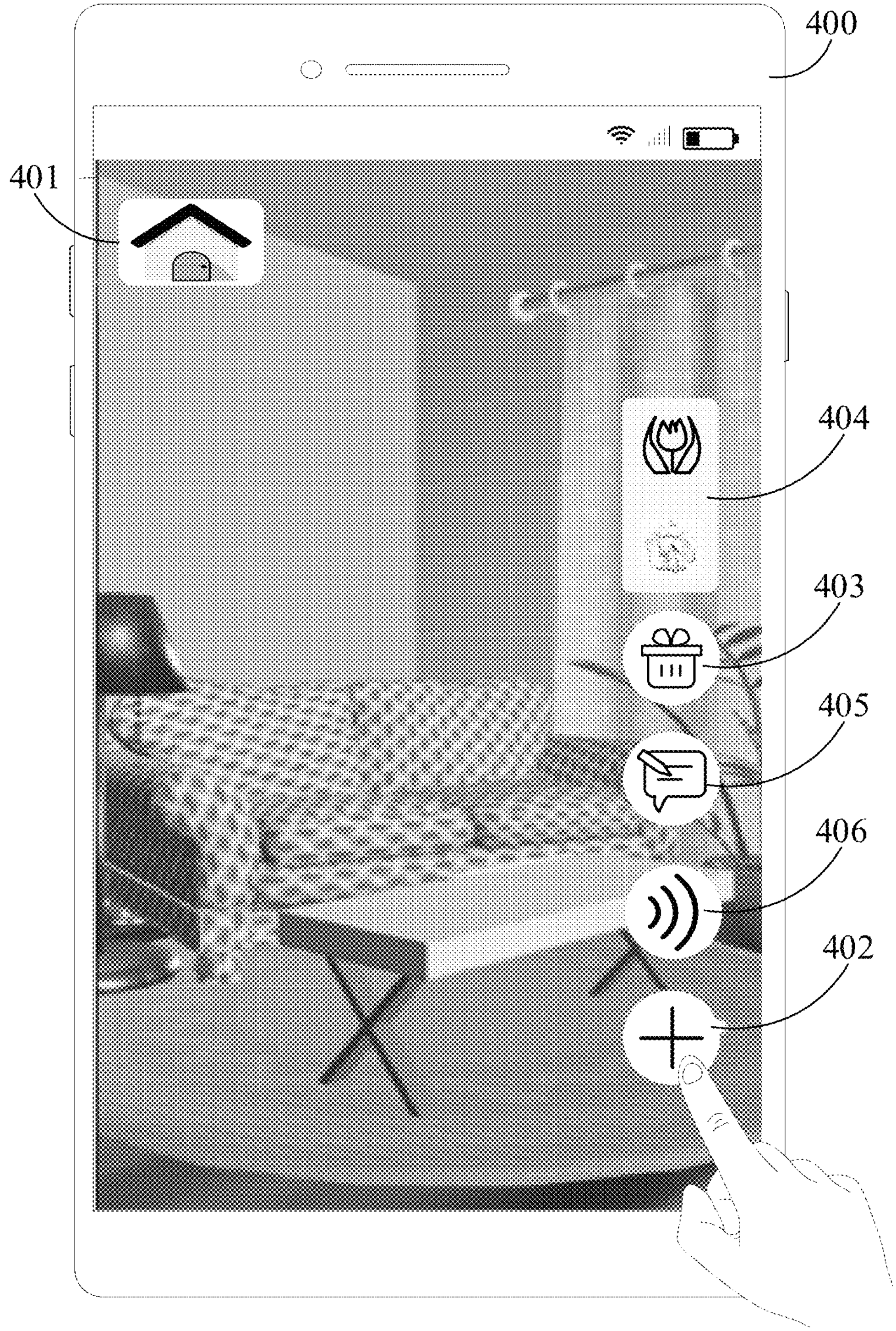
FIG. 4 is a schematic display diagram for displaying an object addition control in a virtual reality space page provided by an embodiment of the present disclosure.

For example, the electronic apparatus 300 in FIG. 3 displays a room list page 301, which displays various virtual reality space information, i.e., "Room of X1" 302, "Room of X2" 303, "Room of X3" 304 and "My Room" 305. After the first user clicks "My Room" 305, the electronic apparatus 300 displays the virtual reality space as shown in FIG. 4. In FIG. 4, the electronic apparatus 400 displays the virtual reality space corresponding to "My Room". In addition, the electronic apparatus 400 may also display a return room list control 401, and the first user may return to the room list page 301 shown in FIG. 3 by performing a trigger operation on the return room list control 401.

Based on augmented reality technology, the first user may carry the electronic apparatus to perform some interactive operations. If a client terminal developed based on augmented reality technology is provided with a logic to detect interactive operations such as a position, posture, and gesture of a user and the user's trigger on the screen, then the electronic apparatus installed with the client terminal may perform the detection of the interactive operations according to the above logic. Based on this, when the first user performs an interactive operation, the electronic apparatus may detect the interactive operation of the first virtual target in the virtual reality space. Then, the electronic apparatus generates first interactive data according to the detected interactive operation. After that, the electronic apparatus uploads the first interactive data to the first server terminal to share the first interactive data.

S220: receiving a second interactive data corresponding to a second virtual target sent by the first server terminal, wherein the second virtual target and the first virtual target share the virtual reality space.

Wherein, the second virtual target refers to a virtual target corresponding to a second user. In some embodiments, the second virtual target is constructed based on person attribute information of the second user. The construction of the second virtual target may refer to a description on the construction of the first virtual target in S210. The second interactive data is interactive data generated by the second virtual target performing an interactive operation in the virtual reality space.

Specifically, after the second user selects the virtual reality space selected by the first user, the first virtual target and the second virtual target simultaneously exist in the virtual display space.

Similar to an execution flow of the first client terminal, an electronic apparatus corresponding to the second client terminal may also detect an interactive operation of the second user, generate second interactive data based on the interactive operation, and upload the second interactive data to the first server terminal to share the second interactive data.

After receiving the first interactive data and the second interactive data, the server terminal determines that there is no intersection (such as repetition, conflict, etc.) between the first interactive data and the second interactive data, and transparently transmits the first interactive data and the second interactive data to the electronic apparatus. In this way, the electronic apparatus may receive the first interactive data and the second interactive data, that is, the first client terminal obtains the interactive data generated by the interactive operations of the first virtual target and the second virtual target in the virtual reality space at the same time, so it has data foundation to display an interactive process of the corresponding virtual targets according to real interactive operation of each user.

It should be understood that the second client terminal may also receive the first interactive data and the second interactive data transparently transmitted by the first server terminal.

In some embodiments, in order to make the first user and the second user share the virtual reality space, the electronic apparatus sends a space address of the virtual reality space to the second server terminal before S220, so that the second server terminal sends the space address to the second client terminal corresponding to the second virtual target, and in response to a space sharing operation of the second client terminal, schedules a target server corresponding to the first server terminal for the second client terminal.

Specifically, according to the above explanation, the second user may select the same virtual reality space as the first user through his/her electronic apparatus. Before this operation, the electronic apparatus should first send a space address of its virtual reality space to the second server terminal. When the second server terminal receives and stores the space address, it may forward the space address to an electronic apparatus corresponding to the second client terminal according to a space authorization information sent by the first client terminal (such as everyone can see the virtual reality space, friends can see the virtual reality space, etc.).

Then, after the second user logs in the second client terminal, an electronic apparatus thereof may also display a room list page, and the room list page may display the virtual reality space information corresponding to the first user. The second user may perform a trigger operation on the virtual reality space information (i.e. a space sharing operation) to request for joining the virtual reality space corresponding to the first user. The electronic apparatus corresponding to the second user sends related information of the space sharing operation to the second server terminal. The second server terminal schedules a server (i.e. a target server), with appropriate load and corresponding to the first server terminal, for the second client terminal, and sends server information of the target server to the second client terminal. The second client terminal may be connected to the target server based on the server information to enter the virtual reality space corresponding to the first user. This may ensure that the first client terminal and the second client terminal share the same virtual reality space, reduce delay of data transmission, and improve intercommunication efficiency of the first interactive data and the second interactive data.

S230: based on the first interactive data and the second interactive data, calling a physical engine to render the interactive operations of the first virtual target and the second virtual target in the virtual reality space, and generating and displaying an interactive rendering result.

Wherein, the physical engine is used to calculate a motion interaction and dynamics between an object and a scene, between an object and a virtual target, and between objects in a two-dimensional scene or a three-dimensional scene, which uses target attributes (momentum, torque or elasticity) to simulate a rigid body behavior. The physical engine in embodiments of the present disclosure refers to a three-dimensional (3D) physical engine, which is used to simulate rigid body behavior of a virtual target and a virtual object in a three-dimensional scene.

Specifically, the electronic apparatus calls the physical engine to perform a simulating processing of rigid body motion on the first virtual target and its first interactive data, the second virtual target and its second interactive data, and calls a rendering engine to render the processing results of the physical engine to generate an interactive rendering result. After that, the electronic apparatus displays the interactive rendering result. The interactive rendering result is a presentation of the first virtual target and the second virtual target performing the same interactive process as the real interaction in the virtual reality space.

According to the above information interaction method based on augmented reality and applied to the first client terminal in embodiments of the present disclosure, on the basis that the first virtual target corresponding to the first user and the second virtual target corresponding to the second user share the same virtual reality space, the first interactive data may be generated in response to the interactive operation of the first virtual target in the virtual reality space, and the first interactive data may be sent to the first server terminal, and the second interactive data corresponding to the second virtual target sent by the first server terminal is received, so that the first interactive data and the second interactive data may be intercommunicated between the client terminal corresponding to the first user and the client terminal corresponding to the second user. Thereby, each client terminal may call the 3D physical engine based on the same first interactive data and second interactive data, respectively render an interactive operation corresponding to the first virtual target and the second virtual target, generate and display an interactive rendering result, realize that different users perform the interactive process based on actual interactive operations in the virtual reality space, and improve a combination degree between the virtual world and the real world in interactive application programs based on augmented reality, thereby improving the user experience.

In some embodiments, the above interactive data is aim physical engine state information. The physical engine state information refers to information related to a state of a rigid body motion generated by the physical engine based on virtual targets/virtual objects and their interactive operations, which includes not only explicit data that may be directly obtained, but also implicit data generated by simulating the rigid body motion of objects/targets. For example, for falling of a virtual sphere, the physical engine state information may include a position of falling, a speed of falling of the virtual sphere, direction and elasticity of the virtual sphere touching the ground, and so on. For collision of virtual targets, the physical engine state information may include a displacement direction and size, displacement speed and so on after the collision of virtual targets. The aim physical engine state information refers to physical engine state information corresponding to the virtual target after the user performs the interactive operation. In this way, the aim physical engine state information may be directly uploaded to the first server terminal, so that the electronic apparatuses corresponding to the first client terminal and the second client terminal may also directly receive the aim physical engine state information for rendering, which avoids the difference between simulation results obtained by each client terminal due to the fact that each client terminal separately calls the physical engine to perform simulating and calculating on the explicit interactive data, thereby further improving consistency of interactive rendering results between the first client terminal and the second client terminal.

In some embodiments, the aim physical engine state information includes historical physical engine state information and current physical engine state information. The current physical engine state information is physical engine state information at the current moment, that is, physical engine state information generated by an interactive operation at the current moment. Historical physical engine state information refers to physical engine state information at the moment before the current moment, that is, physical engine state information generated by an interactive operation at the moment before the current moment. Then, the first interactive data uploaded by the electronic apparatus to the first server terminal is current physical engine state information and at least one historical physical engine state information. In this way, the first server terminal may judge the respective states of the first virtual target and the second virtual target before the current interactive operation according to the previous interactive operations of the first virtual target and the second virtual target, so as to judge whether the current interactive operations of the first virtual target and the second virtual target are duplicated, conflicted or the like, and then determine whether to perform a fusion processing on the aim physical engine state information uploaded by the first virtual target and the second virtual target, respectively. This can avoid a problem of inconsistency of interactive results in the two client terminals in some special cases, and not only improve the achieving logic of continuous processing of interactive operations, but also further improve consistency of interactive rendering results between the first client terminal and the second client terminal.

In some embodiments, according to the above description, the first server terminal transparently transmits the first interactive data and the second interactive data to the first client terminal and the second client terminal when it judges that there is no intersection between the first interactive data and the second interactive data. Then, in a case that there is an intersection between the first interactive data and the second interactive data, the first server terminal needs to process the two interactive data first, and then distribute the processed interactive data to each client terminal.

Based on the above description, after sending the first interactive data to the first server terminal, the information interaction method based on augmented reality and applied to the first client terminal further comprises: receiving first fusion physical engine state information corresponding to the first virtual target and second fusion physical engine state information corresponding to the second virtual target sent by the first server terminal.

Wherein, the fusion physical engine state information refers to a result obtained by integrating at least two physical engine state information (such as deduplication, conflict treating, etc.). In an embodiment of the present disclosure, the fusion physical engine state information is obtained by integrating the first aim physical engine state information and the second aim physical engine state information. The information integration process may be specifically referred to the explanation on the following embodiments.

Specifically, when there is an intersection between the first aim physical engine state information and the second aim physical engine state information, for example, when electronic apparatuses corresponding to two client terminals both detect the same interactive operation of the first virtual target, there will exist repeating contents in the first aim physical engine state information and the second aim physical engine state information. For another example, the first virtual target performs an interactive operation of dragging the second virtual target, and the second virtual target performs an interactive operation of leaving the virtual reality space, and the two interactive operations at this time cannot form an interactive process. The first aim physical engine state information and the second aim physical engine state information have conflicting contents. The first server terminal will analyze the two aim physical engine state information to judge that there is an intersection between them, and then integrate the first aim physical engine state information and the second aim physical engine state information. For example, corresponding to the above interaction situations of dragging and leaving, the first server terminal may process the first aim physical engine state information into the first fusion physical engine state information of having a dragging action but without moving forward or backward of the dragged virtual target, and maintain the action of the second virtual target leaving the virtual reality space, that is, taking the second aim physical engine state information as the second fusion physical engine state information. After that, the first server terminal sends the first fusion physical engine state information and the second fusion physical engine state information to the electronic apparatus and an electronic apparatus corresponding to the second client terminal. The corresponding electronic apparatuses receives two fusion physical engine state information.

Accordingly, S230 is realized as: calling the physical engine to render the interactive operations of the first virtual target and the second virtual target in the virtual reality space based on the first fusion physical engine state information and the second fusion physical engine state information, and generating and displaying the interactive rendering result. That is, the electronic apparatus uses the two fusion physical engine state information to perform rendering, and obtains an interactive rendering result that is more suitable for the interactive scene. Such setting may further improve the interaction consistency between virtual targets, thus further improving the user experience.

In some embodiments, in a case that the interactive operation is directed at an object in the virtual reality space, S210 may be realized as: displaying an object attribute setting interface in response to the interactive operation of the first virtual target on the virtual object in the virtual reality space; and in response to an input operation to the object attribute setting interface, obtaining object operation attribute information of the virtual object, and generating first interactive data based on the object operation attribute information.

Specifically, a first user performs an interactive operation on an object in a virtual reality space. After the electronic apparatus detects the interactive operation, it may display an interface for setting object attributes (i.e. an object attribute setting interface). The first user may input attribute values of each attribute in the object attribute setting interface. After the electronic apparatus detects the input operation of the first user, it may obtain the attribute values (i.e. object operation attribute information) input by the user, and then generate the first interactive data according to the object operation attribute information.

In an example, the above interactive operation on virtual targets in the virtual reality space is a furniture addition operation on virtual furniture, so the process of generating the first interactive data is as follows: in response to the furniture addition operation of adding a virtual furniture to the virtual reality space by the first virtual target, displaying a furniture attribute setting interface of the virtual furniture; and in response to the input operation on the furniture attribute setting interface, obtaining furniture addition attribute information of the virtual furniture, and generating a first interactive data based on the furniture addition attribute information.

Figure 5:
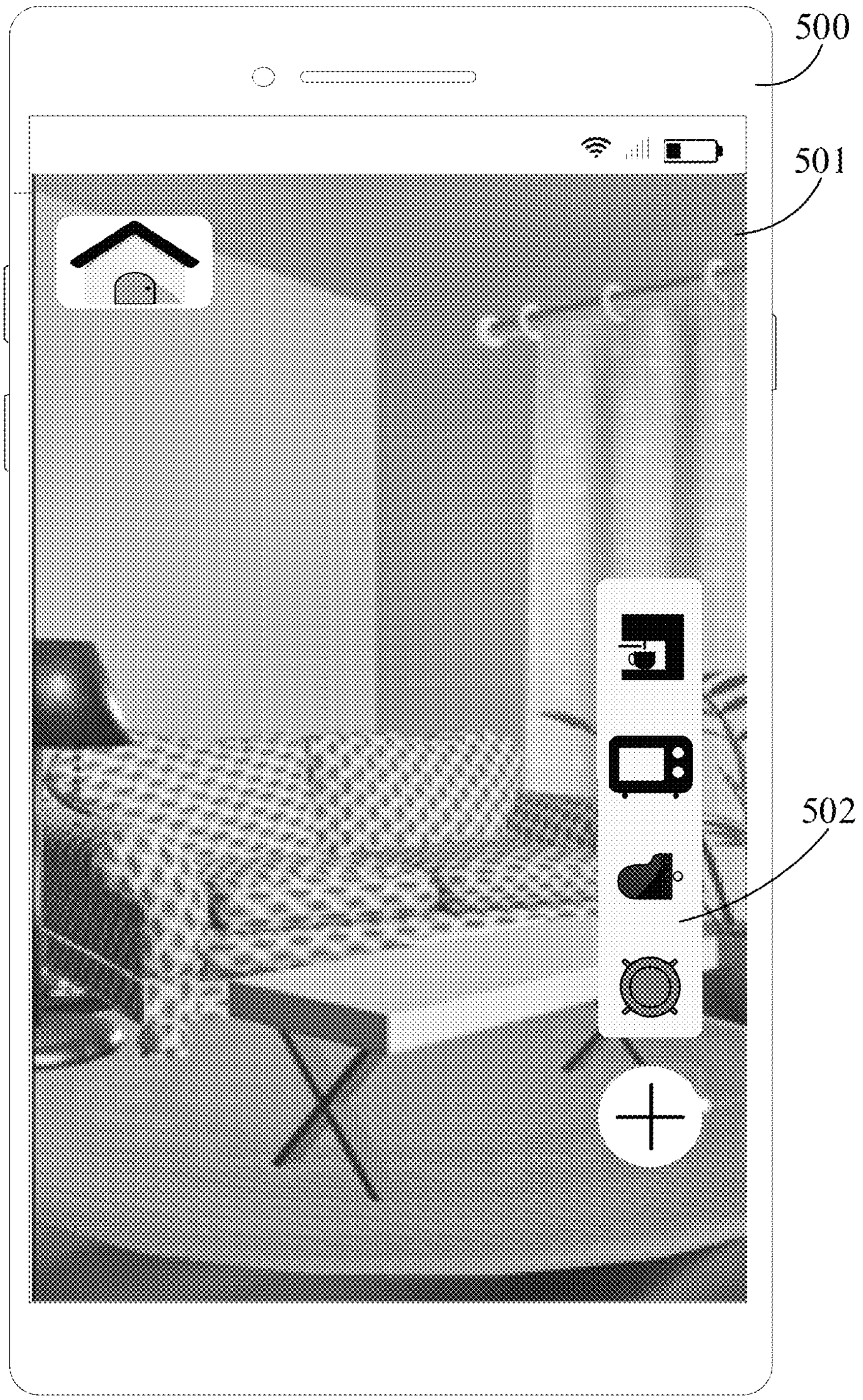
FIG. 5 is a schematic display diagram for displaying a furniture option in a virtual reality space page provided by an embodiment of the present disclosure.

Specifically, continuously referring to FIG. 4, the electronic apparatus 400 may also display a furniture addition control 402 in the virtual reality space. When the first user triggers (e.g., clicks) the furniture adding control 402, the furniture option, that may be added, appears in the interface of the virtual reality space, as shown in FIG. 5. In FIG. 5, a virtual reality space page 501 is displayed in an electronic apparatus 500, and a furniture option 502 is displayed in the virtual reality space page 501, wherein the furniture option 502 includes furniture icon controls such as a stool, a piano, a microwave oven, a coffee maker and so on. The first user may trigger the furniture icon control that he/she wants to add, and the electronic apparatus may then present the furniture attribute setting interface. The furniture attribute setting interface may be an interface that provides attribute fields and their corresponding input boxes, and may also be an interactive three-dimensional object model that provides functions such as dragging, moving and modifying dimension and so on. The first user inputs furniture addition attribute information such as position, size, style and color of the added furniture through the furniture attribute setting interface. After receiving the furniture addition attribute information, the electronic apparatus generates the first interactive data corresponding to it. In this way, a user may add furniture to the virtual reality space according to real environment or preferences thereof, which improves the user's operability on the virtual reality space and thus enhances the interest.

In another example, the above interactive operation on virtual targets in the virtual reality space is a furniture deletion operation on virtual furniture. Then the process of generating the first interactive data is: in response to the furniture removal operation on the aim virtual furniture in the virtual reality space by the first virtual target, generating the first interactive data.

Specifically, after the first user triggers a certain virtual furniture (i.e. an aim virtual furniture) displayed by the electronic apparatus in the virtual reality space page, the electronic apparatus may display a furniture deletion control around the aim virtual furniture. When the first user triggers the furniture deletion control, the electronic apparatus may detect the furniture removal operation of the first virtual target on the aim virtual furniture, and then the electronic apparatus may delete the relevant data of the aim virtual furniture from the virtual reality space to generate the first interactive data. This may enable a user to delete some furniture in the virtual reality space according to real environment where the user is located or preferences thereof, and may also improve user's operability on the virtual reality space, thus enhancing the interest.

In yet another example, the above-mentioned interactive operation on virtual targets in virtual reality space is a furniture modification operation on the virtual furniture, then the process of generating the first interactive data is as follows: in response to a furniture modification operation of the first virtual target on the aim virtual furniture in virtual reality space, displaying a furniture attribute setting interface; and in response to an input operation on the furniture attribute setting interface, obtaining furniture modification attribute information of the aim virtual furniture, and generating first interactive data based on the furniture modification attribute information.

Specifically, after the first user triggers the aim virtual furniture displayed by the electronic apparatus in the virtual reality space page, the electronic apparatus may also display a furniture modification control around the aim virtual furniture. When the first user triggers the furniture modification control, the electronic apparatus may detect the furniture modification operation of the first virtual target on the aim virtual furniture. Then, the electronic apparatus displays the furniture attribute setting interface on the basis of the virtual reality space page. The first user inputs modified attribute information (i.e., furniture modification attribute information) of certain attributes of the aim virtual furniture through the furniture attribute setting interface, such as position, size, style, color, and so on of the furniture. After receiving the furniture modification attribute information, the electronic apparatus generates the first interactive data corresponding to it. In this way, it may enable a user to modify information of a furniture in the virtual reality space according to real environment where the user is located or preferences thereof, and it may also improve users' operability on the virtual reality space, thus enhancing the interest.

It should be noted that if the second client terminal implements the information interaction method based on augmented reality, since it is a visitor to the virtual reality space, it does not have an authority to add, modify and delete a furniture in this embodiment, that is, the information interaction method based on augmented reality and applied to the second client terminal does not have the functions in these embodiments.

In yet another example, the above-mentioned interactive operation on virtual objects in the virtual reality space is an item addition operation on a non-furniture virtual item, and then the process of generating the first interactive data is as follows: in response to an item addition operation of adding a non-furniture virtual item to the virtual reality space by the first virtual target, displaying an item attribute setting interface of the virtual item; and in response to an input operation to the item attribute setting interface, obtaining item addition attribute information of the virtual item, and generating the first interactive data based on the item addition attribute information.

Specifically, continuously referring to FIG. 4, the electronic apparatus 400 may also display an item addition control 403 for a non-furniture virtual item in the virtual reality space. When the first user triggers (e.g., clicks) the item addition control 403, the electronic apparatus detects the item addition operation corresponding to the first virtual user, and then displays an item option 404, that may be added, in the interface of the virtual reality space. The item option 404 may include item icon controls such as a flower, a paper ball, a toy (not shown in FIG. 4) and so on. The first user may trigger the item icon control that he/she wants to add, and the electronic apparatus may present the item attribute setting interface to prompt the first user to input some attribute information of the virtual item (i.e., item addition attribute information), for example, message information for virtual targets in virtual reality space, display time and display duration of virtual items, etc. After the first user inputs the item addition attribute information through the item attribute setting interface, the electronic apparatus may receive the item addition attribute information, and then generate the first interactive data corresponding thereto. In this way, it may enable a user to place an item such as a gift and so on in the virtual reality space, and may also add his/her message information, further enhancing interactivity of different users in the same virtual reality space, thus further enhancing the interest.

It should be noted that the item addition operation of the non-furniture virtual item may also be the interactive operation of the second user, that is, the information interaction method based on augmented reality and applied to the second client has the function of the embodiment.

On the basis of the above embodiment of adding a non-furniture virtual item to the virtual reality space, the information interaction method based on augmented reality and applied to the first client further includes: after displaying the interactive rendering result and under a condition that the item addition attribute information contains message information, in response to the interactive operation of the first virtual target on the virtual item in the virtual reality space, displaying the message information of the virtual item.

Specifically, after a non-furniture virtual item is added into the virtual reality space and is rendered and displayed, the first user may see the virtual item. The first user may perform interactive operations such as touching, picking up and the like on the virtual item. After the electronic apparatus detects the interactive operation, it may display the message information corresponding to the virtual item. In this way, the interaction of message information may be realized, and the effect of message reminding/prompting other users may be achieved, and the consistency between the interaction process of different users in the virtual reality space and the interaction process of real users may be further enhanced, thus further improving the user experience.

In yet another example, referring to FIG. 4, the electronic apparatus 400 may also display a text control 405 for a message in a text form and/or a voice control 406 for a message/interaction in a voice form in a page of the virtual reality space. The first user may leave a text message by triggering the text control 405. The first user may also leave a voice message or perform a voice interaction by triggering the voice control 406. The above text message, voice message and interactive voice may all be generated as first interactive data for data interaction and rendering display among client terminals. This may further increase interaction manners of users in the virtual reality space, thus further enhancing the interest and user experience.

It should be noted that the above examples only illustrate that the virtual target performs some active interactive operations in the virtual reality space to generate the first interactive data. The first interactive data may also be generated for the interactive operation of a passive collision/contact of the virtual target with a furniture, an item and so on in the virtual reality space (such as the virtual target touching the virtual furniture during movement). That is, as long as any of the virtual target, virtual furniture, virtual item and so on in the virtual reality space changes, the first interactive data may be generated, and the subsequent steps are executed to render and display, so as to realize a dynamic process of the virtual reality space and contents comprised therein.

In some embodiments, information communication between each client terminal and the first server terminal is realized based on remote procedure call technology.

Specifically, according to the above description, the active or passive interactive operation of virtual targets in the virtual reality space needs to generate interactive data and synchronize them, and the number of users participating in the interaction in the same virtual reality space may be large, so the communication between each client terminal and the server terminal is very frequent, with more data content, and it needs to develop an independent and abstract virtual target for each user and interactive operation thereof. In this case, in order to improve the development efficiency and communication efficiency so as to perform sharing of interactive data and displaying of interactive rendering results among client terminals real-time/near-real-time, a stable, low-delay communication framework capable of reasonably performing abstract package of targets, such as a communication framework related to Remote Procedure Call (RPC), is adopted in the embodiment of the disclosure.

The embodiment of the present disclosure also provides an information interaction method based on augmented reality and applied to the first server terminal, which may be executed by an information interaction device based on augmented reality and configured in the first server terminal. The device may be realized by software and/or hardware manners, and the device may be integrated in an electronic apparatus with a larger data processing capability. The electronic apparatus may include, but is not limited to, a notebook computer, a desktop computer, a server and the like.

Figure 6:
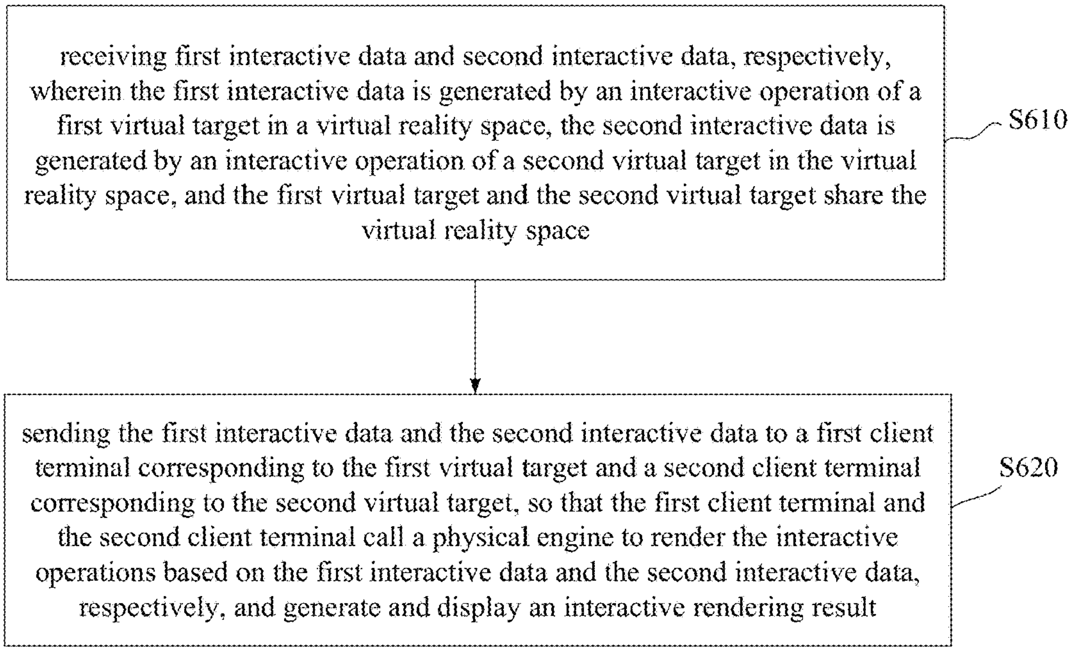
FIG. 6 is a flowchart of an information interaction method based on augmented reality applied to a first server terminal provided by an embodiment of the present disclosure.

FIG. 6 shows a schematic flowchart of an information interaction method based on augmented reality and applied to a first server terminal provided by an embodiment of the present disclosure. The description on the terms and steps in various embodiments of the method which are the same as or similar to those of the above-mentioned embodiments will not be repeated here. As shown in FIG. 6, the information interaction method based on augmented reality and applied to the first server terminal may include the following steps:

S610: receiving first interactive data and second interactive data, respectively, wherein the first interactive data is generated by an interactive operation of a first virtual target in a virtual reality space, the second interactive data is generated by an interactive operation of a second virtual target in the virtual reality space, and the first virtual target and the second virtual target share the virtual reality space.

Specifically, the first server terminal may receive the first interactive data and the second interactive data from the first client terminal and the second client terminal.

S620: sending the first interactive data and the second interactive data to a first client terminal corresponding to the first virtual target and a second client terminal corresponding to the second virtual target, so that the first client terminal and the second client terminal call a physical engine to render the interactive operations based on the first interactive data and the second interactive data, respectively, and generate and display an interactive rendering result.

Specifically, when the first server terminal judges that there is no intersection between the first interactive data and the second interactive data, it synchronously and transparently transmits the first interactive data and the second interactive data to the first client terminal and the second client terminal. In this way, the first client terminal and the second client terminal may perform rigid body motion simulation and rendering display based on the same interactive data.

The information interaction method based on augmented reality and applied to the first server terminal provided by the embodiment of the present disclosure may serve as a bridge for interactive data communication between the first client terminal and the second client terminal, collect the first interactive data and the second interactive data generated by the first client terminal and the second client terminal corresponding to the shared virtual reality space, and send the first interactive data and the second interactive data to the first client terminal and the second client terminal, respectively, so that the first client terminal and the second client terminal call the 3D physical engine to perform interactive rendering based on the same interactive data and display the same interactive rendering result, which realize to perform the interactive process based on actual interactive operation by different users in the virtual reality space, and a combination degree between the virtual world and the real world in interactive application programs based on augmented reality is improved, thereby improving the user experience.

In some embodiments, after receiving the first interactive data and the second interactive data, respectively, the information interaction method based on augmented reality and applied to the first server terminal further comprises: in a case that the interactive data is aim physical engine state information and it is determined that there is an intersection between first aim physical engine state information and second aim physical engine state information, generating first fusion physical engine state information corresponding to the first virtual target and second fusion physical engine state information corresponding to the second virtual target, based on the first aim physical engine state information and the second aim physical engine state information.

Specifically, in a case that the first server terminal judges whether there is an intersection between the first aim physical engine state information and the second aim physical engine state information, for example, in a case that electronic apparatuses corresponding to two client terminals both detect the same interactive operation of the first virtual target, there will be repeating contents in the first aim physical engine state information and the second aim physical engine state information. For another example, the first virtual target performs an interactive operation to drag the second virtual target, while the second virtual target performs an interactive operation to leave the virtual reality space, and at this time, the two interactive operations cannot form an interactive process, and the first aim physical engine state information and the second aim physical engine state information have conflicting contents. For another example, both the first virtual target and the second virtual target perform interactive operations on the same virtual item (such as a football), and there will be overlapping contents and so on in the first aim physical engine state information and the second aim physical engine state information. The first server terminal will integrate the first aim physical engine state information and the second aim physical engine state information according to the specific interactive operations to generate the first fusion physical engine state information and the second fusion physical engine state information.

Accordingly, S620 may be realized as: sending the first fusion physical engine state information and the second fusion physical engine state information to the first client terminal and the second client terminal. That is, the data synchronously sent by the first server terminal to the first client terminal and the second client terminal is the first fusion physical engine state information and the second fusion physical engine state information. Such setting may further improve interaction consistency between virtual targets, and improve consistency between the interaction process of virtual targets and the real interaction process, thus further improving the user experience.

In an example, generating the fusion physical engine state information may be realized as: generating the first fusion physical engine state information and the second fusion physical engine state information, based on the first aim physical engine state information and the second aim physical engine state information, according to preset priorities corresponding to the first virtual target and the second virtual target.

Wherein, the preset priorities are interactive priority set in advance for each virtual target in the same virtual reality space. The higher the preset priority, the earlier its interactive operation will be responded. The preset priority may be set according to the user's authority in the virtual reality space. For example, the preset priority of a first user (such as a room owner) is higher than that of a second user (such as a room visitor). The preset priority may also be set according to a sequence of users entering the virtual reality space. For example, a virtual target corresponding to a user who enters the virtual reality space first has a higher preset priority.

Specifically, the preset priority of each virtual target is preset in the first server terminal. When the first server terminal judges that there is an intersection between the first aim physical engine state information and the second aim physical engine state information, the first server terminal retains aim physical engine state information with higher preset priority, and modifies another aim physical engine state information according to the retained aim physical engine state information. The technical solution of this example is applicable to the case that both the first virtual target and the second virtual target perform interactive operations on the same virtual item (such as a football).

For example, in a case that both the first virtual target and the second virtual target perform kicking operations on the same football and the preset priority of the first virtual target is higher than that of the second virtual target, the first server terminal directly determines the first aim physical engine state information as the first fusion physical engine state information, and then correspondingly modifies the second aim physical engine state information according to the first fusion physical engine state information to generate the second fusion physical engine state information. In this way, the first virtual target may realize the interaction of playing football according to the strength and direction of its kicking, while the effect of the kicking operation of the second virtual target will be far less than that of the first virtual target.

In another example, generating the fusion physical engine state information may be realized as: in a case that the first virtual target and the second virtual target perform interactive operations with an interactive order, generating the first fusion physical engine state information and the second fusion physical engine state information based on the first aim physical engine state information and the second aim physical engine state information, according to the interaction order.

Specifically, if the first virtual target and the second virtual target perform continuous interactive operations with an interactive order in the virtual reality space, the effectiveness of the interactive operations triggered by the two virtual targets at the same time may be determined according to the interactive order.

For example, the first virtual target and the second virtual target play a chess game in the virtual reality space, then the interaction order is determined by an order of putting down chess pieces. For a case that the first virtual target and the second virtual target perform operations of putting down a chess piece at the same time after the first virtual target performs an operation of putting down a chess piece, the first server terminal may determine that the second virtual target performs the next operation of putting down a chess piece. Then, the first server terminal may directly determine the second aim physical engine state information as the second fusion physical engine state information, and set the first aim physical engine state information as invalid. At this time, the first server terminal may take the first aim physical engine state information as main information in the first fusion physical engine state information, delete the information related to putting down the chess piece, and add relevant prompt information that the operation of putting down the chess piece by the first virtual target is invalid and putting down the chess piece is not executed. The first server terminal may also directly ignore the first aim physical engine state information and set the first fusion physical engine state information to remain unchanged. This may ensure that the interactive games in the virtual reality space keep consistent game rules and interactive effects with real interactive games.

In yet another example, generating the fusion physical engine state information may be realized as: generating the first fusion physical engine state information and the second fusion physical engine state information based on values of the same state variable or priorities of different state variables in the first aim physical engine state information and the second aim physical engine state information.

Specifically, the first server terminal may set priorities of state variables for each state variable in the physical engine state information in the interactive operation in advance. Then, when the interaction operations of the first virtual target and the second virtual target trigger different state variables, respectively, the first server terminal may generate the first fusion physical engine state information and the second fusion physical engine state information according to priorities of the respective state variables.

For example, for a case that the first virtual target performs an interactive operation of dragging the second virtual target and the second virtual target performs an interactive operation of leaving the virtual reality space at the same time, and the priority of the state variable of the leaving operation is higher than that of the state variable of interacting in the virtual reality space, the first server terminal may directly determine the second aim physical engine state information of the second virtual target as the second fusion physical engine state information, so as to ensure that the second user normally exits the virtual reality space. Then, the first server terminal modifies the first aim physical engine state information in a state that the second virtual target is empty. For example, the first server terminal may process the first aim physical engine state information into the first fusion physical engine state information with a dragging action but without actions of moving forward or backward and so on after dragging. This may make the interaction of virtual targets in virtual reality space more coincident with actual interaction logic, and further improve effectiveness and authenticity of virtual target interaction.

In addition, in a case that the interactive operations of the first virtual target and the second virtual target do not trigger the priority judgment of different state variables, if their interactive operations have the same state variable, the first server terminal may generate the first fusion physical engine state information and the second fusion physical engine state information according to a magnitude relationship of values of the state variable in the two aim physical engine state information.

For example, for a case that both the first virtual target and the second virtual target perform a kicking operation on the same football and a kicking force of the first virtual target is greater than that of the second virtual target, the first server terminal may comprehensively calculate the kicking force and kicking direction in the first aim physical engine state information and the second aim physical engine state information according to actual motion law that the kicking force of the first virtual target is greater and the movement of the football is more the same as the kicking operation of the first virtual target, but will be affected by the kicking operation of the second virtual target, so as to generate the first fusion physical engine state information and the second fusion physical engine state information. In this way, the interactive operation in virtual reality space may be consistent with the motion law of actual interactive operation, further improving effectiveness and authenticity of virtual target interaction.

Figure 7:
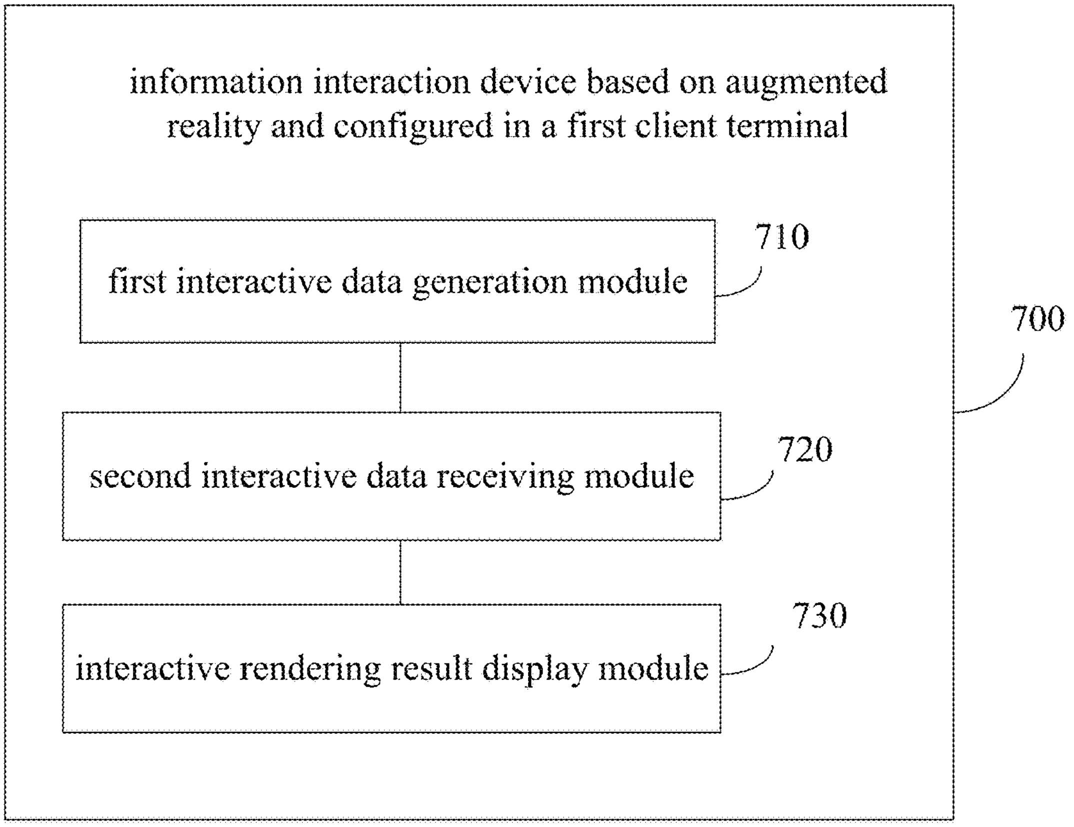
FIG. 7 is a schematic structural diagram of an information interaction device based on augmented reality and configured in a client terminal provided by an embodiment of the present disclosure.

FIG. 7 shows a schematic structural diagram of an information interaction device based on augmented reality and provided in a first client terminal provided by an embodiment of the present disclosure. As shown in FIG. 7, the information interaction device 700 based on augmented reality and configured at the first client terminal may include:

- a first interactive data generation module 710, for generating first interactive data in response to an interactive operation of a first virtual target in a virtual reality space, and sending the first interactive data to a first server terminal;
- a second interactive data receiving module 720, for receiving second interactive data corresponding to a second virtual target sent by the first server terminal, wherein the second virtual target and the first virtual target share the virtual reality space; and an interactive rendering result display module 730, for calling a physical engine to render the interactive operations of the first virtual target and the second virtual target in the virtual reality space based on the first interactive data and the second interactive data, and generating and displaying an interactive rendering result.

Through the information interaction device based on augmented reality and configured at the first client terminal, on the basis that the first virtual target corresponding to the first user and the second virtual target corresponding to the second user share the same virtual reality space, the first interactive data may be generated in response to the interactive operation of the first virtual target in the virtual reality space, and the first interactive data may be sent to the first server terminal, and the second interactive data corresponding to the second virtual target sent by the first server may be received, so that the first interactive data and the second interactive data may be intercommunicated between the client terminal corresponding to the first user and the client terminal corresponding to the second user, so that each client terminal may call a 3D physical engine based on the same first and second interactive data, render the interactive operations corresponding to the first virtual target and the second virtual target, respectively, generate and display the interactive rendering result, realize that different users perform the interactive process based on actual interactive operations in the virtual reality space, and improve a combination degree between the virtual world and the real world in interactive application programs based on augmented reality, thereby improving the user experience.

In some embodiments, the interaction data is aim physical engine state information.

In some embodiments, the aim physical engine state information includes historical physical engine state information and current physical engine state information.

In some embodiments, the information interaction device 700 based on augmented reality and configured at the first client terminal further comprises a fusion information receiving module, which is used for:

after sending the first interactive data to the first server terminal, receiving the first fusion physical engine state information corresponding to the first virtual target and the second fusion physical engine state information corresponding to the second virtual target sent by the first server terminal, wherein the fusion physical engine state information is obtained based on the first aim physical engine state information and the second aim physical engine state information.

Correspondingly, the interactive rendering result display module 730 is specifically used for: based on the first fusion physical engine state information and the second fusion physical engine state information, calling the physical engine to render the interactive operations of the first virtual target and the second virtual target in the virtual reality space, and generating and displaying the interactive rendering result.

In some embodiments, the first interactive data generation module 710 is specifically used for:

displaying an object attribute setting interface in response to the interactive operation of the first virtual target on the virtual target in the virtual reality space; and in response to an input operation to the object attribute setting interface, obtaining an object operation attribute information of the virtual target, and generating the first interactive data based on the object operation attribute information.

In some embodiments, the information interaction device 700 based on augmented reality and configured at the first client terminal further comprises a space address sending module, which is used for:

before receiving the second interactive data corresponding to the second virtual target sent by the first server terminal, sending a space address of the virtual reality space to the second server terminal, so that the second server terminal sends the space address to the second client terminal corresponding to the second virtual target, and in response to a space sharing operation of the second client terminal, scheduling an aim server corresponding to the first server terminal for the second client terminal.

In some embodiments, the virtual reality space is constructed based on the real space where the first virtual target is located, and the first virtual target and the second virtual target are constructed based on personal attribute information of the first user and the second user, respectively.

It should be noted that the information interaction device 700 based on augmented reality and configured at the first client terminal as shown in FIG. 7 may perform various steps in the method embodiments shown in FIGS. 2 to 5, and achieve various processes and effects in the method embodiments shown in FIGS. 2 to 5, which will not be repeated here.

Figure 8:
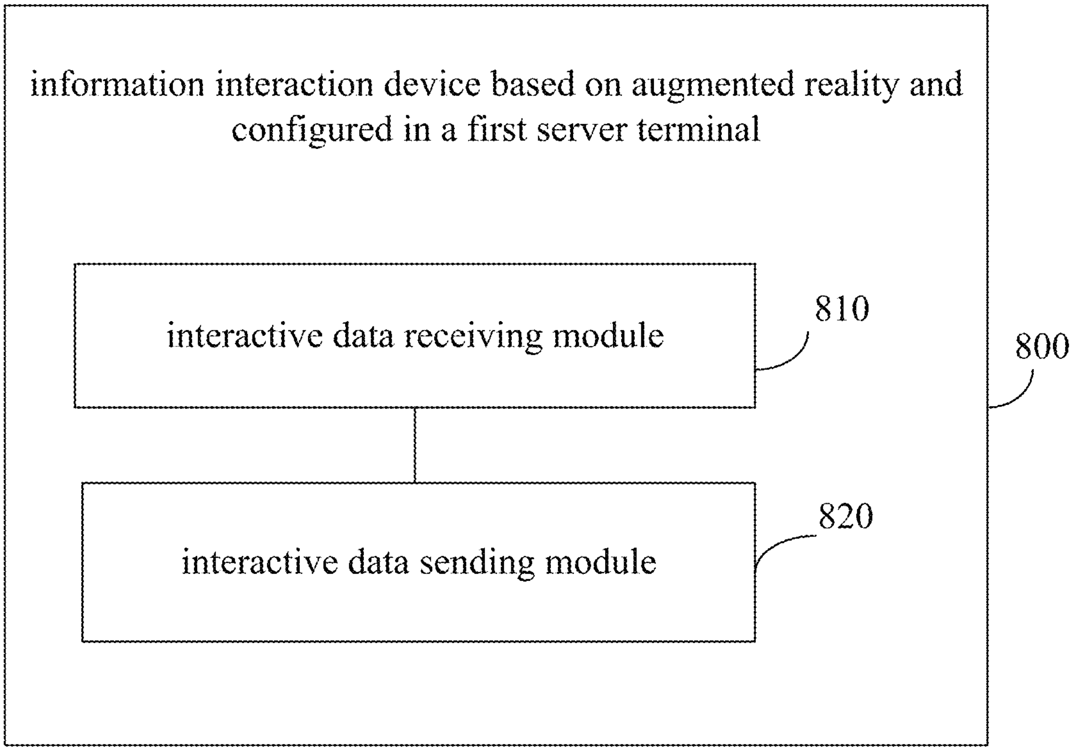
FIG. 8 is a schematic structural diagram of an information interaction device based on augmented reality and configured in a first server terminal provided by an embodiment of the present disclosure.

FIG. 8 shows a schematic structural diagram of an information interaction device based on augmented reality and configured at a first server terminal provided by an embodiment of the present disclosure. As shown in FIG. 8, the information interaction device 800 based on augmented reality and configured at the first server terminal may include:

an interactive data receiving module 810, for receiving first interactive data and second interactive data, respectively, wherein, the first interactive data is generated by an interactive operation of a first virtual target in a virtual reality space, and the second interactive data is generated by an interactive operation of a second virtual target in the virtual reality space, and the first virtual target and the second virtual target share the virtual reality space;

an interactive data sending module 820, for sending the first interactive data and the second interactive data to a first client terminal corresponding to the first virtual target and a second client terminal corresponding to the second virtual target, so that the first client terminal and the second client terminal respectively call a physical engine to render interactive operations based on the first interactive data and the second interactive data, and generate and display an interactive rendering result.

Through the information interaction device based on augmented reality and configured at the first server terminal, it may serve as a bridge for intercommunication of interactive data of the first client terminal and the second client terminal, collect the first interactive data and the second interactive data generated by the first client terminal and the second client terminal corresponding to the shared virtual reality space, and send the first interactive data and the second interactive data to the first client terminal and the second client terminal, respectively, so that the first client terminal and the second client terminal call a 3D physical engine to perform interactive rendering based on the same interactive data and display the same interactive rendering result, which realize that different users perform the interactive process based on actual interactive operations in the virtual reality space, and the combination degree between the virtual world and the real world in interactive application programs based on augmented reality is improved, thereby improving the user experience.

In some embodiments, the information interaction device 800 based on augmented reality and configured at the first server further comprises an information fusion module, which is for:

after receiving the first interactive data and the second interactive data respectively, in a case that the interactive data is aim physical engine state information and it is determined that there is an intersection between the first aim physical engine state information and the second aim physical engine state information, generating first fusion physical engine state information corresponding to the first virtual target and second fusion physical engine state information corresponding to the second virtual target based on the first and second aim physical engine state informations.

Correspondingly, the interactive data sending module 820 is specifically for: sending the first fusion physical engine state information and the second fusion physical engine state information to the first client terminal and the second client terminal.

In some embodiments, the information fusion module is specifically for:

generating the first fusion physical engine state information and the second fusion physical engine state information based on the first aim physical engine state information and the second aim physical engine state information, according to preset priorities corresponding to the first virtual target and the second virtual target;

or, in a case that the first virtual target and the second virtual target perform interactive operations having an interactive order, generating the first fusion physical engine state information and the second fusion physical engine state information based on the first aim physical engine state information and the second aim physical engine state information according to the interactive order;

or, generating the first fusion physical engine state information and the second fusion physical engine state information, based on values of a same state variable or priorities of different state variables in the first aim physical engine state information and the second aim physical engine state information.

It should be noted that the information interaction device 800 based on augmented reality and configured at the first server terminal as shown in FIG. 8 may perform various steps in the method embodiment shown in FIG. 6, and achieve various processes and effects in the method embodiment shown in FIG. 6, which will not be repeated here.

Embodiments of the present disclosure further provide an electronic apparatus, which may include a processor and a memory, and the memory may be used to store executable instructions. Wherein, the processor may be used to read the executable instructions from the memory and execute the executable instructions to realize the information interaction method based on augmented reality and applied to the first client terminal or the information interaction method based on augmented reality and applied to the first server terminal in any of the above embodiments.

In some embodiments, in a case of performing functions such as generating interactive data, generating and displaying the interactive rendering result and so on, the electronic apparatus may be the first client terminal 11 or the second client terminal 12 shown in FIG. 1. In other embodiments, in a case of performing functions such as collecting and distributing interactive data and so on, the electronic apparatus may be the first server terminal 13 shown in FIG. 1.

Figure 9:
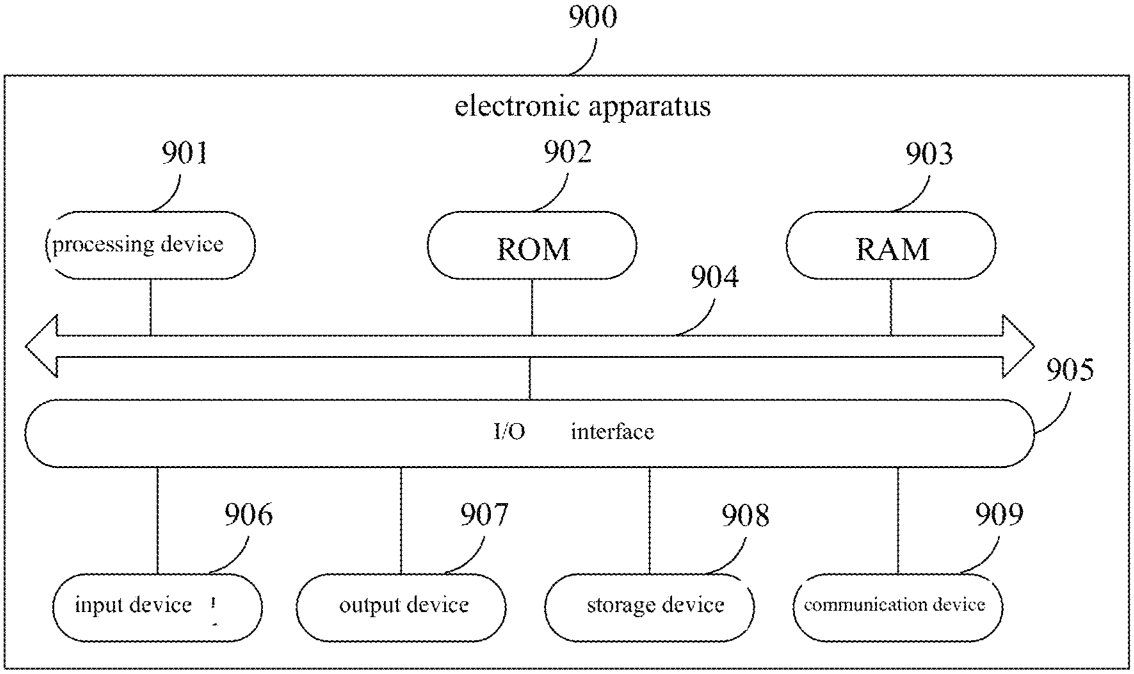
FIG. 9 is a schematic structural diagram of an information interaction apparatus based on augmented reality provided by an embodiment of the present disclosure.

FIG. 9 shows a schematic structural diagram of an electronic apparatus provided by an embodiment of the present disclosure. It should be noted that the electronic apparatus 900 shown in FIG. 9 is only an example, and it should not bring any restriction on functions and application scope of the embodiments of the present disclosure.

As shown in FIG. 9, the electronic apparatus 900 may include a processing device (such as a central processing unit, a graphics processor, etc.) 901, which may perform various appropriate actions and processes according to a program stored in a read-only memory (ROM) 902 or a program loaded from a storage device 908 into a random access memory (RAM) 903. In the RAM 903, various programs and data required for the operation of the information processing apparatus 900 are also stored. The processing device 901, the ROM 902 and the RAM 903 are connected to each other through a bus 904. An input/output interface (I/O interface) 905 is also connected to the bus 904.

Usually, the following apparatus may be connected to the I/O interface 905: an input apparatus 906 including, for example, a touch screen, a touch pad, a keyboard, a mouse, a camera, a microphone, an accelerometer, a gyroscope, or the like; an output apparatus 907 including, for example, a liquid crystal display (LCD), a loudspeaker, a vibrator, or the like; a storage apparatus 908 including, for example, a magnetic tape, a hard disk, or the like; and a communication apparatus 909. The communication apparatus 909 may allow the electronic apparatus 900 to be in wireless or wired communication with other apparatuses to exchange data. While FIG. 9 illustrates the electronic apparatus 900 having various devices, it should be understood that not all of the illustrated devices are necessarily implemented or included. More or fewer devices may be implemented or included alternatively.

An embodiment of the present disclosure also provides a computer-readable storage medium which stores a computer program and, when the computer program is executed by a processor, which enables the processor to implement an augmented reality-based information interaction method applied to the first client in any embodiment of the present disclosure; or which realizes an augmented reality-based information interaction method applied to the first server terminal in any embodiment of the present disclosure.

In the information interaction solution based on augmented reality provided in the embodiment of the present disclosure, on the basis that the first virtual target corresponding to the first user and the second virtual target corresponding to the second user share the same virtual reality space, the first interactive data may be generated in response to the interactive operation of the first virtual target in the virtual reality space, and the first interactive data may be sent to the first server terminal, and the second interactive data corresponding to the second virtual target sent by the first server terminal is received, so that the first interactive data and the second interactive data may be intercommunicated between the client terminal corresponding to the first user and the client terminal corresponding to the second user. Thereby, each client terminal may call the 3D physical engine based on the same first interactive data and second interactive data, respectively render an interactive operation corresponding to the first virtual target and the second virtual target, generate and display an interactive rendering result, realize that different users perform the interactive process based on actual interactive operations in the virtual reality space, and improve a combination degree between the virtual world and the real world in interactive application programs based on augmented reality, thereby improving the user experience.

Particularly, according to some embodiments of the present disclosure, the processes described above with reference to the flowcharts may be implemented as a computer software program. For example, some embodiments of the present disclosure include a computer program product, which includes a computer program carried by a non-transitory computer-readable medium. The computer program includes program codes for performing the methods shown in the flowcharts. In such embodiments, the computer program may be downloaded online through the communication apparatus 909 and installed, or may be installed from the storage apparatus 908, or may be installed from the ROM 902. When the computer program is executed by the processing apparatus 901, the above-mentioned functions defined in the information interaction methods based on augmented reality and applied to the first client terminal in any embodiment of the present disclosure are performed; or the above-mentioned functions defined in the information interaction methods based on augmented reality and applied to the first server terminal in any embodiment of the present disclosure are performed.

It should be noted that the above-mentioned computer-readable medium in the present disclosure may be a computer-readable signal medium or a computer-readable storage medium or any combination thereof. For example, the computer-readable storage medium may be, but not limited to, an electric, magnetic, optical, electromagnetic, infrared, or semiconductor system, apparatus or device, or any combination thereof. More specific examples of the computer-readable storage medium may include but not be limited to: an electrical connection with one or more wires, a portable computer disk, a hard disk, a random-access memory (RAM), a read-only memory (ROM), an erasable programmable read-only memory (EPROM or flash memory), an optical fiber, a compact disk read-only memory (CD-ROM), an optical storage device, a magnetic storage device, or any appropriate combination of them. In the present disclosure, the computer-readable storage medium may be any tangible medium containing or storing a program that can be used by or in combination with an instruction execution system, apparatus or device. In the present disclosure, the computer-readable signal medium may include a data signal that propagates in a baseband or as a part of a carrier and carries computer-readable program codes. The data signal propagating in such a manner may take a plurality of forms, including but not limited to an electromagnetic signal, an optical signal, or any appropriate combination thereof. The computer-readable signal medium may also be any other computer-readable medium than the computer-readable storage medium. The computer-readable signal medium may send, propagate or transmit a program used by or in combination with an instruction execution system, apparatus or device. The program code contained on the computer-readable medium may be transmitted by using any suitable medium, including but not limited to an electric wire, a fiber-optic cable, radio frequency (RF) and the like, or any appropriate combination of them.

In some implementation modes, the client and the server may communicate with any network protocol currently known or to be researched and developed in the future such as hypertext transfer protocol (HTTP), and may communicate (via a communication network) and interconnect with digital data in any form or medium. Examples of communication networks include a local area network (LAN), a wide area network (WAN), the Internet, and an end-to-end network (e.g., an ad hoc end-to-end network), as well as any network currently known or to be researched and developed in the future.

The above-mentioned computer-readable medium may be included in the above-mentioned electronic device, or may also exist alone without being assembled into the electronic device.

The above-mentioned computer-readable medium carries one or more programs, and when the one or more programs are executed by the electronic device, the electronic device is caused to: execute steps of the information interaction method based on augmented reality and applied to the first client terminal described in any embodiment of the present disclosure; display an initial picture of a target visual effect at a preset position of the background image; or execute steps of the information interaction method based on augmented reality and applied to the first server terminal described in any embodiment of the present disclosure.

In the embodiment of the present disclosure, the computer program codes for performing the operations of the present disclosure may be written in one or more programming languages or a combination thereof. The above-mentioned programming languages include but are not limited to object-oriented programming languages such as Java, Smalltalk, C++, and also include conventional procedural programming languages such as the "C" programming language or similar programming languages. The program code may be executed entirely on the user's computer, partly on the user's computer, as a stand-alone software package, partly on the user's computer and partly on a remote computer, or entirely on the remote computer or server. In the scenario related to the remote computer, the remote computer may be connected to the user's computer through any type of network, including a local area network (LAN) or a wide area network (WAN), or the connection may be made to an external computer (for example, through the Internet using an Internet service provider).

The flowcharts and block diagrams in the accompanying drawings illustrate the architecture, functionality, and operation of possible implementations of systems, methods, and computer program products according to various embodiments of the present disclosure. In this regard, each block in the flowcharts or block diagrams may represent a module, a program segment, or a portion of codes, including one or more executable instructions for implementing specified logical functions. It should also be noted that, in some alternative implementations, the functions noted in the blocks may also occur out of the order noted in the accompanying drawings. For example, two blocks shown in succession may, in fact, can be executed substantially concurrently, or the two blocks may sometimes be executed in a reverse order, depending upon the functionality involved. It should also be noted that, each block of the block diagrams and/or flowcharts, and combinations of blocks in the block diagrams and/or flowcharts, may be implemented by a dedicated hardware-based system that performs the specified functions or operations, or may also be implemented by a combination of dedicated hardware and computer instructions.

The units involved in the embodiments of the present disclosure may be implemented in software or hardware. Among them, the name of the module or unit does not constitute a limitation of the unit itself under certain circumstances.

The functions described herein above may be performed, at least partially, by one or more hardware logic components. For example, without limitation, available exemplary types of hardware logic components include: a field programmable gate array (FPGA), an application specific integrated circuit (ASIC), an application specific standard product (ASSP), a system on chip (SOC), a complex programmable logical device (CPLD), etc.

In the context of the present disclosure, the machine-readable medium may be a tangible medium that may include or store a program for use by or in combination with an instruction execution system, apparatus or device. The machine-readable medium may be a machine-readable signal medium or a machine-readable storage medium. The machine-readable medium includes, but is not limited to, an electrical, magnetic, optical, electromagnetic, infrared, or semi-conductive system, apparatus or device, or any suitable combination of the foregoing. More specific examples of machine-readable storage medium include electrical connection with one or more wires, portable computer disk, hard disk, random-access memory (RAM), read-only memory (ROM), erasable programmable read-only memory (EPROM or flash memory), optical fiber, portable compact disk read-only memory (CD-ROM), optical storage device, magnetic storage device, or any suitable combination of the foregoing.

The above description is only a better embodiment of the present disclosure and an explanation of the technical principles used. Those skilled in the art shall understand that the disclosure scope involved in the disclosure shall not be limited to technical solutions formed by a particular combination of the above technical features, but shall also cover other technical solutions formed by any combination of the above technical features or their equivalents without being separated from the above disclosed concept. For example, the technical solution formed by replacing the above features with the technical features disclosed in this disclosure (but not limited to) having similar functions.

In addition, although operations are described in a particular order, this should not be understood as requiring those operations to be performed in the showing particular order or in a sequential order. In certain circumstances, a plurality of tasks and parallel processing may be advantageous. Similarly, although certain implementation details are included in the above discussion, these should not be interpreted as limiting the scope of this disclosure. Certain features described in the context of individual embodiments may also be implemented in combination in a single embodiment. Conversely, various features described in the context of a single embodiment may also be implemented in multiple embodiments individually or in any suitable sub-combination.

Although the subject matter has been described in language specific to structural features and/or method logical actions, it should be understood that the subject matter defined in the attached claims is not necessarily limited to the specific features or actions described above. Rather, the specific features and actions described above are merely example forms of implementing claims.

What is claimed is:

1. An information interaction method based on augmented reality and applied to a first client terminal, the method comprising:

generating first interactive data in response to an interactive operation of a first virtual target in a virtual reality space, and sending the first interactive data to a first server terminal;

receiving second interactive data corresponding to a second virtual target sent by the first server terminal, wherein the second virtual target and the first virtual target share the virtual reality space; and calling a physical engine to render the interactive operation of the first virtual target and the interactive operation of the second virtual target in the virtual reality space based on the first interactive data and the second interactive data, and generating and displaying an interactive rendering result, wherein each of the first interactive data and the second interactive data is aim physical engine state information, a physical engine state information refers to information related to a state of a rigid body motion generated by a physical engine based on virtual targets/virtual objects and their interactive operations, wherein the aim physical engine state information includes historical physical engine state information and current physical engine state information, wherein before receiving second interactive data corresponding to a second virtual target sent by the first server terminal, the method further comprises:

the first server terminal judge respective states of the first virtual target and the second virtual target before current interactive operation according to previous interactive operations of the first virtual target and the second virtual target, and according to the historical physical engine state information and the current physical engine state information corresponding to the first virtual target and the historical physical engine state information and the current physical engine state information of the second virtual target, so as to determine whether to perform a fusion processing on the aim physical engine state information respectively corresponding to the first virtual target and the second virtual target;

if the fusion processing is performed, a first fusion physical engine state information corresponding to the first virtual target and a second fusion physical engine state information corresponding to the second virtual target are generated.

2. The method according to claim 1, wherein, after the first interactive data is sent to the first server terminal, the method further comprises:

receiving the first fusion physical engine state information corresponding to the first virtual target and the second fusion physical engine state information corresponding to the second virtual target sent by the first server terminal, wherein each of the first and second fusion physical engine state information is obtained based on first aim physical engine state information and second aim physical engine state information;

the calling the physical engine to render the interactive operations of the first virtual target and the second virtual target in the virtual reality space based on the first interactive data and the second interactive data, and generating and displaying the interactive rendering result comprises:

based on the first fusion physical engine state information and the second fusion physical engine state information, calling the physical engine to render the interactive operations of the first virtual target and the second virtual target in the virtual reality space, and generating and displaying the interactive rendering result.

3. The method according to claim 1, wherein generating the first interactive data in response to the interactive operation of the first virtual target in the virtual reality space comprises:

displaying an object attribute setting interface in response to the interactive operation of the first virtual target on a virtual object in the virtual reality space; and in response to an input operation to the object attribute setting interface, obtaining object operation attribute information of the virtual object, and generating the first interactive data based on the object operation attribute information.

4. The method according to claim 1, wherein, before receiving the second interactive data corresponding to the second virtual target sent by the first server terminal, the method further comprises:

sending a space address of the virtual reality space to a second server terminal, so that the second server terminal sends the space address to a second client terminal corresponding to the second virtual target, and in response to a space sharing operation of the second client terminal, schedules an aim server corresponding to the first server terminal for the second client terminal.

5. The method according to claim 1, wherein the virtual reality space is constructed based on a real space where the first virtual target is located, and the first virtual target and the second virtual target are constructed based on personal attribute information of a first user and a second user, respectively.

6. An information interaction method based on augmented reality and applied to a first server terminal, the method comprising:

receiving first interactive data and second interactive data, respectively, wherein the first interactive data is generated by an interactive operation of a first virtual target in a virtual reality space, and the second interactive data is generated by an interactive operation of a second virtual target in the virtual reality space, and the first virtual target and the second virtual target share the virtual reality space; and sending the first interactive data and the second interactive data to a first client terminal corresponding to the first virtual target and a second client terminal corresponding to the second virtual target, so that the first client terminal and the second client terminal respectively call a physical engine to render the interactive operation based on the first interactive data and the second interactive data, and generate and display an interactive rendering result, wherein each of the first interactive data and the second interactive data is aim physical engine state information, a physical engine state information refers to information related to a state of a rigid body motion generated by a physical engine based on virtual targets/virtual objects and their interactive operations, wherein the aim physical engine state information includes historical physical engine state information and current physical engine state information, wherein after receiving second interactive data corresponding to a second virtual target sent by the first server terminal, the method further comprises:

the first server terminal judge respective states of the first virtual target and the second virtual target before current interactive operation according to previous interactive operations of the first virtual target and the second virtual target, and according to the historical physical engine state information and the current physical engine state information corresponding to the first virtual target and the historical physical engine state information and the current physical engine state information of the second virtual target, so as to determine whether to perform a fusion processing on the aim physical engine state information respectively corresponding to the first virtual target and the second virtual target;

if the fusion processing is performed, a first fusion physical engine state information corresponding to the first virtual target and a second fusion physical engine state information corresponding to the second virtual target are generated.

7. The method according to claim 6, wherein, after receiving the first interactive data and the second interactive data, respectively, the method further comprises:

in a case that it is determined that there is an intersection between the first aim physical engine state information and the second aim physical engine state information, generating the first fusion physical engine state information corresponding to the first virtual target and the second fusion physical engine state information corresponding to the second virtual target, based on the first aim physical engine state information and the second aim physical engine state information, sending the first interactive data and the second interactive data to the first client terminal corresponding to the first virtual target and the second client terminal corresponding to the second virtual target comprises:

sending the first fusion physical engine state information and the second fusion physical engine state information to the first client terminal and the second client terminal.

8. The method according to claim 7, wherein the generating the first fusion physical engine state information corresponding to the first virtual target and the second fusion physical engine state information corresponding to the second virtual target based on the first aim physical engine state information and the second aim physical engine state information comprises:

generating the first fusion physical engine state information and the second fusion physical engine state information based on the first aim physical engine state information and the second aim physical engine state information, according to preset priorities corresponding to the first virtual target and the second virtual target;

or, in a case that the first virtual target and the second virtual target perform interactive operations having an interactive order, generating the first fusion physical engine state information and the second fusion physical engine state information based on the first aim physical engine state information and the second aim physical engine state information according to the interactive order;

or, generating the first fusion physical engine state information and the second fusion physical engine state information based on a value of a same state variable or priorities of different state variables in the first aim physical engine state information and the second aim physical engine state information.

9. An information interaction device based on augmented reality and configured in a client terminal, and performing the information interaction method according to claim 1, and the information interaction device comprising:

a first interactive data generation module, configured to generate first interactive data in response to an interactive operation of a first virtual target in a virtual reality space, and send the first interactive data to a first server terminal;

a second interactive data receiving module, configured to receive second interactive data corresponding to a second virtual target sent by the first server terminal, wherein the second virtual target and the first virtual target share the virtual reality space; and an interactive rendering result display module, configured to call a physical engine to render the interactive operation of the first virtual target and the second virtual target in the virtual reality space based on the first interactive data and the second interactive data, and generate and display an interactive rendering result.

10. An information interaction device based on augmented reality and configured in a first server terminal, and performing the information interaction method according to claim 6, the information interaction device comprising:

an interactive data receiving module, configured to receive first interactive data and second interactive data, respectively, wherein the first interactive data is generated by an interactive operation of a first virtual target in a virtual reality space, and the second interactive data is generated by an interactive operation of a second virtual target in the virtual reality space, and the first virtual target and the second virtual target share the virtual reality space; and an interactive data sending module, configured to send the first interactive data and the second interactive data to a first client terminal corresponding to the first virtual target and a second client terminal corresponding to the second virtual target, so that the first client terminal and the second client terminal respectively call a physical engine to render the interactive operations based on the first interactive data and the second interactive data, and generate and display an interactive rendering result.

11. An electronic apparatus, comprising:

a processor; and a memory, configured to store an executable instruction, wherein the processor is configured to read the executable instruction from the memory and execute the executable instruction to realize the information interaction method based on augmented reality and applied to the first client terminal described in claim 1.

12. A computer-readable storage medium, wherein the storage medium stores a computer program, which, when executed by a processor, causes the processor to realize the information interaction method based on augmented reality and applied to the first client terminal according to claim 1.

13. The method according to claim 1, wherein, after the first interactive data is sent to the first server terminal, the method further comprises:

receiving the first fusion physical engine state information corresponding to the first virtual target and the second fusion physical engine state information corresponding to the second virtual target sent by the first server terminal, wherein the fusion physical engine state information is obtained based on first aim physical engine state information and the aim physical engine state information;

the calling the physical engine to render the interactive operations of the first virtual target and the second virtual target in the virtual reality space based on the first interactive data and the second interactive data, and generating and displaying the interactive rendering result comprises:

based on the first fusion physical engine state information and the second fusion physical engine state information, calling the physical engine to render the interactive operations of the first virtual target and the second virtual target in the virtual reality space, and generating and displaying the interactive rendering result.

14. An electronic apparatus, comprising:

a processor; and a memory, configured to store an executable instruction, wherein the processor is configured to read the executable instruction from the memory and execute the executable instruction to realize the information interaction method based on augmented reality and applied to the first server terminal described in claim 6.

15. A computer-readable storage medium, wherein the storage medium stores a computer program, which, when executed by a processor, causes the processor to realize the information interaction method based on augmented reality and applied to the first server terminal according to claim 6.

* * * * *